United States Patent
Perret

(10) Patent No.: US 9,200,374 B2
(45) Date of Patent: Dec. 1, 2015

(54) DEVICE FOR HIGH-TEMPERATURE WATER ELECTROLYSIS HAVING IMPROVED OPERATION

(75) Inventor: Christian Perret, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 335 days.

(21) Appl. No.: 13/583,099

(22) PCT Filed: Mar. 11, 2011

(86) PCT No.: PCT/EP2011/053728
§ 371 (c)(1),
(2), (4) Date: Sep. 6, 2012

(87) PCT Pub. No.: WO2011/110679
PCT Pub. Date: Sep. 15, 2011

(65) Prior Publication Data
US 2012/0325652 A1 Dec. 27, 2012

(30) Foreign Application Priority Data
Mar. 12, 2010 (FR) .................... 10 51781

(51) Int. Cl.
*C25B 9/08* (2006.01)
*C25B 9/04* (2006.01)
*C25B 9/18* (2006.01)

(52) U.S. Cl.
CPC ... *C25B 9/04* (2013.01); *C25B 9/08* (2013.01); *C25B 9/18* (2013.01); *Y02E 60/366* (2013.01)

(58) Field of Classification Search
CPC ..... C25B 1/02–1/12; C25B 9/04; C25B 9/08; C25B 9/18; H01M 8/02; H01M 8/026; H01M 8/0263; H01M 8/0265; Y02E 60/366
See application file for complete search history.

(56) References Cited

U.S. PATENT DOCUMENTS 7,381,313 B2 * 6/2008 Libby et al. .................... 204/239
8,317,986 B2 11/2012 Le Gallo
(Continued)

FOREIGN PATENT DOCUMENTS

EP 1 482 585 12/2004
FR 2 921 390 3/2009
(Continued)

OTHER PUBLICATIONS

Li, X., et al., "Review of Bipolar Plates in PEM fuel cells: Flow-field designs," International Journal of Hydrogen Energy, vol. 30, pp. 359-371, (2005).
(Continued)

*Primary Examiner* — James Lin
*Assistant Examiner* — Ciel Thomas
(74) *Attorney, Agent, or Firm* — Oblon, McClelland, Maier & Neustadt, L.L.P.

(57) ABSTRACT

A device for high temperature electrolysis of water, including: at least one elementary electrolysis cell formed from a cathode, an anode, and an electrolyte intermediate between the cathode and the anode; a first device forming an electric and fluid interconnector including a metallic part delimited by at least one plane, the metallic part including two internal chambers, superposed one on the other, and a plurality of holes distributed around the surface, approximately perpendicular to the plane and divided into two groups, one of the groups of holes opens up onto the plane and directly into the adjacent chamber and the other group of holes opens up onto the plane and also in a furthest chamber through channels, the plane of the first interconnector being in mechanical contact with the plane of the cathode.

15 Claims, 4 Drawing Sheets

(56) References Cited

U.S. PATENT DOCUMENTS

| | | |
|---|---|---|
| 2005/0221161 A1 | 10/2005 | Komada et al. |
| 2006/0231368 A1* | 10/2006 | Brissenden et al. ..... 192/85 AA |
| 2006/0237306 A1* | 10/2006 | Nakazawa et al. ............ 204/258 |
| 2007/0092775 A1 | 4/2007 | Komada et al. |
| 2008/0241618 A1* | 10/2008 | Sato et al. ........................ 429/22 |
| 2008/0296173 A1* | 12/2008 | Mishra et al. ................. 205/742 |
| 2009/0098433 A1 | 4/2009 | Komada et al. |
| 2009/0169970 A1 | 7/2009 | Komada et al. |
| 2010/0200422 A1 | 8/2010 | Le Gallo et al. |
| 2012/0325654 A1 | 12/2012 | Le Gallo et al. |
| 2012/0325677 A1 | 12/2012 | Le Gallo |
| 2013/0032490 A1 | 2/2013 | Le Gallo et al. |

FOREIGN PATENT DOCUMENTS

| | | |
|---|---|---|
| JP | 7-145492 | 6/1995 |
| JP | 2007-227317 | 9/2007 |
| WO | WO 2009/040335 A2 | 4/2009 |

OTHER PUBLICATIONS

International Search Report Issued Apr. 19, 2011 n PCT/EP11/53728 Filed Mar. 11, 2011.

French Search Report Issued Sep. 30, 2010 in FR 10 51781 Filed Mar. 12, 2010.

Office Action issued Nov. 25, 2014 in Japanese Patent Application No. 2012-556537 (with English-language Translation).

\* cited by examiner

DEVICE FOR HIGH-TEMPERATURE WATER ELECTROLYSIS HAVING IMPROVED OPERATION

TECHNICAL DOMAIN

The invention relates to a device for high temperature electrolysis (HTE) of water, also called a high temperature water electrolyser, or high temperature steam electrolyser (HTSE).

Specifically, it describes a new HTE electrolyser architecture that makes its operation smoother.

PRIOR ART

A High Temperature water Electrolyser (HTE) comprises at least one elementary electrochemical cell composed of an electrolyte, a cathode and an anode, the electrolyte being located between the anode and the cathode. The electrolyte is gas tight, electronically insulating and is an ion conductor. The electrodes (anode and cathode) are made of porous material and are electronic conductors.

An HTE electrolyser also comprises fluid and electrical interconnection devices that are in electrical contact with one or more electrodes. These interconnection devices generally perform all current delivery and collection functions and delimit one or more gas circulation compartments.

Thus, the function of a so-called cathodic compartment is to distribute current and steam and to collect hydrogen at the cathode in contact.

The function of a so-called anode compartment is to distribute current and to collect oxygen produced at the anode in contact. A draining gas may also be injected into the input to the anode compartment to evacuate the oxygen produced. The additional function of an injected drain gas is to act as a temperature regulator.

FIGS. 1, 1A and 1B show a channel plate 1 frequently used as an interconnection device. Current is delivered in or taken out at the electrode by teeth or ribs 10 that are in direct mechanical contact with the electrode concerned. The delivery of steam at the cathode (or drain gas at the anode) is symbolically represented by arrows in FIG. 1. Hydrogen produced at the cathode is collected (or oxygen produced at the anode is collected) through the channels 11 that open up into a fluid connection, frequently called a manifold, common to the stack of cells. The structure of this type of interconnection device is made to achieve a compromise between the two delivery and collection functions (gas/current)).

The major disadvantages of this channel plate can be summarised as follows.

Firstly, the surface of an electrolysis cell cannot be used uniformly. The electrochemical reaction takes place close to the interface between the electrode and the electrolyte, and the gas, electrons and ions concerned have to be present at the same location, and while it is easy to supply electrons to the zones under the teeth 10 of the collector, it is difficult to supply them with gas. The constraints are the permeability and thickness of the electrode in contact, and the width of the tooth 10. Similarly, it is difficult to supply electrons to the area under the channel 11, since existing electrodes at the present time all have low effective conductivity. The constraints are the effective conductivity, and the thickness and width of the channel 11. The inventor believes that the ratio R between the current delivery/collection area and the steam delivery or produced gas collection area is a parameter representative of real use of the cell surface. In the case of an interconnection channel plate 1, the ratio R calculated below is often less than 50%.

$R=1/(1+w/L)$, where $w$ is the width of the channel 11 and $L$ is the width of the tooth 10.

This plate structure 1 then implies a differentiation between production zones with some zones in which production densities and therefore current densities may be very high although the mean density is low, and therefore with local sources of performance degradation. This is shown locally (millimetric scale) in FIG. 1B on which very strong current lines are shown located at the ribs 10. Similarly, considering the electrode area, current lines are stronger along the input direction than along the output direction, because of the change in the water content in the gas flow between the upstream and downstream parts of the channels.

Similarly, this plate structure 1 implies a non-uniform steam supply to the channels 11 and strong supercharging of this steam is necessary (surplus water equal to more than 100% of consumed water is added) to guarantee a uniform and stable supply for all channels 11, making it difficult to achieve a high steam usage ratio. Conditioning and pressurising of this steam have a non-negligible impact on the consumption of energy associated with the electrolyser.

There is also a mechanical risk that a cell will be loaded in bending if there is a large geometric offset between the teeth of an interconnecting plate 1 on the anode side and the teeth of an interconnecting plate on the cathode side, where the teeth can punch and crack the cell if there is any lack-of-planeness defect. Very high precision in relative assembly of plates on each side of the cell and very high tooth manufacturing quality are necessary to avoid this risk.

Furthermore the channel structure on the anode side with an inlet and an outlet is only useful when a draining gas is used to evacuate oxygen produced outside the cell. Conditioning of this draining gas also induces a significant energy cost.

Finally, this plate structure requires a large material thickness for the produced gas collection zone and shaping (machining) that can be prohibitive. Thin plates and stamping are used but limit manufacturing possibilities for the width of each tooth and the pitch between teeth. The inventor also considers that the reduction in non-homogeneity of currents carried to each cell with such an interconnecting channel plate 1 can only be limited.

Another interconnecting plate 1' has already been disclosed [1]. This plate is shown in FIG. 2 with fluid circulation shown by arrows; it has an interdigitised type structure. It does not solve the problem of mechanical bending mentioned for plate 1 and it can cause hydraulic tearing of the electrode with which it is in contact.

The purpose of this invention is to disclose a solution capable of overcoming all or some of the disadvantages of existing interconnecting plates at the cathode of a high temperature water electrolysis device.

PRESENTATION OF THE INVENTION

To achieve this, the purpose of the invention is a high temperature water electrolysis device comprising:
- at least one elementary electrolysis cell formed from a cathode, an anode, and an electrolyte intermediate between the cathode and the anode,
- a first device forming an electric and fluid interconnector composed of a metallic part delimited by at least one plane P1, said metallic part comprising two internal chambers superposed one on the other and a plurality of holes distributed around the surface, approximately perpendicular to the plane and divided into two groups, one of the groups of holes opens up onto plane P1 and directly into the adjacent chamber and the other group of holes opens up onto plane P1 and also in the furthest chamber through channels, the plane P1 of the first interconnector being in mechanical contact with the plane of the cathode.

Part of the cathodic compartment according to the invention through which steam is brought in is thus composed of two chambers and one group of holes. The other group of holes and the other of the two chambers according to the invention form another part of the cathodic compartment through which hydrogen produced at the cathode is recovered.

All different shapes of holes can be envisaged within the scope of the invention including holes with a circular, oblong section or elongated slits.

For the purposes of the invention, a fluid and electrical interconnector refers to a system for delivering or collecting a current and a fluid to and from an electrode of an electrolysis cell. Thus, an electrolysis device according to the invention may comprise a single electrolysis cell with a first interconnector in contact with its cathode and a second interconnector described below in contact with its anode. Similarly, as described below, an interconnecting plate in a stack of electrolysis cells according to the invention may comprise a first interconnector in contact with the cathode of one elementary electrolysis cell and a second interconnector in contact with the anode of the adjacent electrolysis cell.

This overcomes the disadvantages of the traditional architecture of an interconnecting channel plate according to the state of the art as disclosed in the preamble.

Thus according to the invention, the production density from each electrolysis cell is more uniform and the steam usage (or conversion) rate is better than is possible with HTE electrolyser architectures according to the state of the art.

The fact that a plurality of holes opens up onto the cathode plane means firstly that the electrical behaviour of the entire surface of the cell can be uniform at all points with a limited electrical contact resistance between the cathode and the first interconnector. In other words, the current distribution at the cathode is optimal.

Similarly, due to the superposition of chambers and the plurality of holes, steam can be uniformly and directly injected to any point on the cathode through a group of holes which, unlike the state of the art, can limit the concentration overvoltage.

Two variants can be chosen for steam injection.

According to a first variant, the adjacent chamber is the chamber through which steam is delivered and the furthest chamber is the chamber through which hydrogen produced by electrolysis is collected.

According to a second variant, the adjacent chamber is the chamber through which hydrogen produced by electrolysis is collected and the furthest chamber is the chamber through which steam is delivered.

Advantageously, the holes have a circular cross-section with a diameter of between 0.5 and 5 mm, and preferably between 1.25 mm and 2.5 mm.

Also advantageously, the distance between the centre of two adjacent holes is between 7 mm and 28 mm, and preferably between 7 mm et 14 mm. With such distances, pressure losses of less than 200 millibars can be achieved with electrolysis cells like those used in the calculations with references to the examples given below.

The holes are preferably aligned along parallel lines at equal intervals.

Operation at the cathode can be made even more uniform by advantageously providing one group of aligned holes opening up onto plane P1 and directly into the adjacent chamber, alternating with another group of aligned holes opening up onto plane P1 and into the furthest chamber.

Alternation may also be achieved such that the holes in the group opening up both on plane P1 and directly in the adjacent chamber are staggered with the holes opening up both on plane P1 and in the furthest chamber, each hole in the group opening up both onto plane P1 and directly in the adjacent chamber being in the middle of four holes in the group opening up both onto plane P1 and in the furthest chamber, and vice versa.

Also preferably, the four holes in a group form a square, the hole in the other group being in the middle of the square. The principle of repetition by staggered alternation induces even more uniform operation over the entire cell in terms of fluidics (delivery of steam and collection of hydrogen produced), thermal (heat uniformly distributed at all points of the electrolysis cell) and electrochemistry (identical electrolysis reaction at all points in the cell). Furthermore, the first interconnector has easily achievable dimensions.

The electrolysis device according to the invention may comprise a second device forming an electrical and fluid interconnector composed of a metal part delimited by at least one plane, said metallic part comprising an internal chamber and a plurality of holes distributed over the entire surface, approximately perpendicular to the plane and opening up onto the plane and into the chamber, the plane of the second interconnector being in mechanical contact with the plane of the anode.

The plane P2 of the second interconnector can be in direct mechanical contact with the plane of the anode.

The water electrolysis device according to the invention may comprise a stack of elementary electrolysis cells each formed from a cathode, an anode and an electrolyte placed between the cathode and the anode, an interconnecting plate comprising a first and a second interconnector being formed between two adjacent elementary cells such that the plane P1 of the first interconnector is in mechanical contact with the cathode of one of the two elementary cells and the plane of the second interconnector is in mechanical contact with the anode of the other of the two elementary cells.

Finally, the invention relates to a hydrogen production assembly comprising a plurality of electrolysis devices like those described above.

BRIEF DESCRIPTION OF THE DRAWINGS

Other advantages and characteristics will become clearer after reading the description given below with reference to the drawings among which.

DETAILED PRESENTATION OF PARTICULAR EMBODIMENTS

The interconnecting plate of HTE electrolysers according to the state of the art and shown in FIGS. 1, 1A, 1B and 2 have been commented on at length in the preamble. Therefore they will not be described below.

Symbols and arrows representing steam, hydrogen and oxygen paths are shown in all figures, for reasons of clarity.

High temperature electrolysis according to the invention may be done at temperatures of at least 450° C., and typically between 700° C. and 1000° C.

Figure 1:
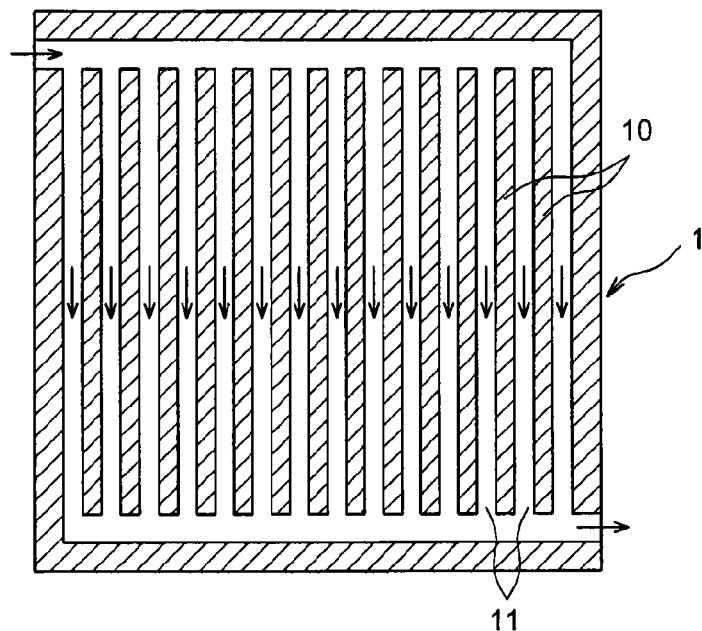
FIG. 1 shows a diagrammatic front view of an interconnecting plate of an HTE electrolyser according to prior art.
Figure 1A:
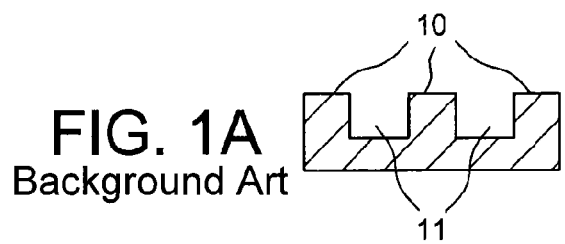
FIG. 1A shows a detailed view of an interconnecting plate according to FIG. 1.
Figure 1B:
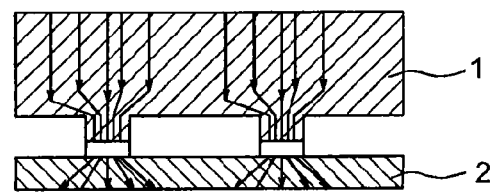
FIG. 1B shows a view corresponding to the view in FIG. 1A illustrating current lines passing through the plate.
Figure 2:
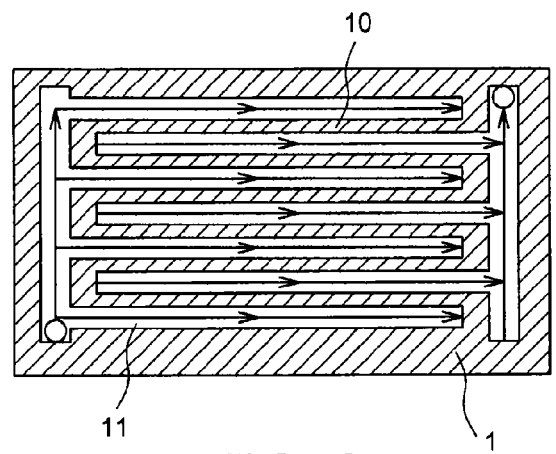
FIG. 2 is a diagrammatic front view of another interconnecting plate of an electrolyser according to the state of the art.
Figure 3:
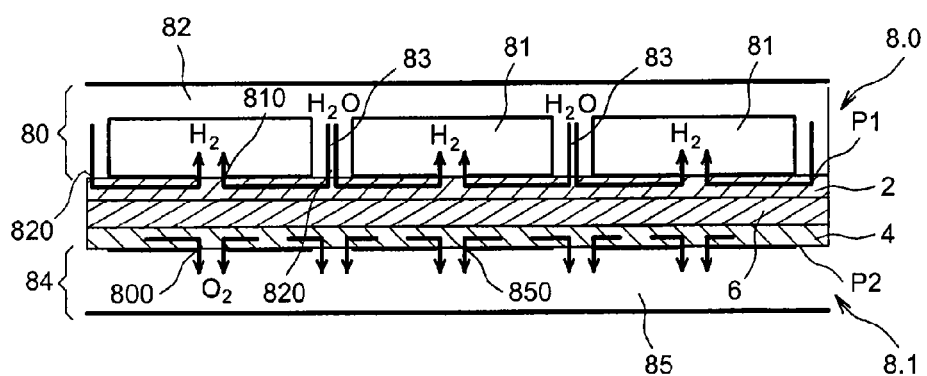
FIG. 3 is a sectional diagrammatic view of an electrolysis device according to the invention with one electrolysis cell.
Figure 4:
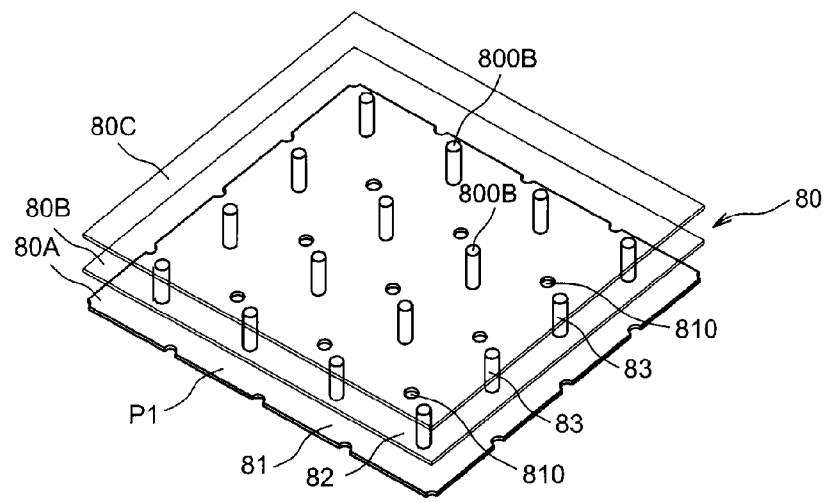
FIG. 4 is an internal transparent perspective view of a fluid and electrical interconnector according to the invention.

An electrolysis device according to the invention as shown in FIGS. 3 and 4 includes an elementary electrolysis cell formed from a cathode 2, an anode 4, and an electrolyte 6 between the cathode and the anode.

According to the invention, there is a first device 8.0 forming an electrical and fluid interconnector composed of a metal part delimited by at least one plane P1.

The metal part 80 comprises two internal chambers 81, 82 superposed one above the other and a plurality of holes 810, 820 approximately perpendicular to plane P1 and divided into two groups.

One of the groups of holes 810 opens up onto plane P1 and directly into the adjacent chamber 81, and the other group of holes 820 opens up directly onto plane P1 and into the furthest chamber 82 through channels 83.

The plane P1 of the first interconnector 8.0 is in mechanical contact with the plane of the cathode 2.

As shown in FIG. 3, steam is injected directly through the chamber 82 furthest from the plane P1, for the electrolysis reaction.

As shown by the arrow and the $H_2$ and $H_2O$ symbols in FIG. 3, steam injected through this chamber 82 then circulates through the channels 83 and is then progressively transformed into hydrogen in the pores of the cathode 2 due to the uniform delivery of electrical current over the entire cell surface by the interconnector 8.0.

Some of the hydrogen is drawn off uniformly through each of the holes 810 in the other group and then evacuated through the chamber 81 into which the holes 810 open up.

The electrolysis device according to the invention as shown in FIG. 3 comprises a second interconnector 8.1 on the side of anode 4.

This interconnector 8.1 also comprises a metallic part 84 delimited by a plane P2 in direct mechanical contact with the plane of the anode 4.

The metallic part 84 comprises an internal chamber 85 and a plurality of holes 850 distributed over its surface approximately perpendicular to the plane, and opening up both onto plane P2 and into chamber 85.

As shown by the arrow and the $O_2$ symbol in FIG. 3, oxygen produced at the anode 4 is collected through each of the holes 850 and then evacuated through the chamber 85.

FIG. 4 shows an example embodiment of the first interconnector 8.1 according to the invention.

The metallic part 80 is composed of an assembly of three plates 80A, 80B, 80C parallel to each other. One of the plates 80A is perforated by two groups of holes 810, 820 arranged along lines parallel to each other and at regular intervals.

The second plate 80B is also perforated but with a single group 800B of holes that communicates with the group of holes 820 in the first plate 80A through tubular spacers that form the channels 83.

The space between the first plate 80A and the second plate 80b forms the hydrogen collection chamber 81.

The third plate 80C is solid and is separated from the second plate 80B by a space that forms the other steam delivery chamber 81.

Figure 5:
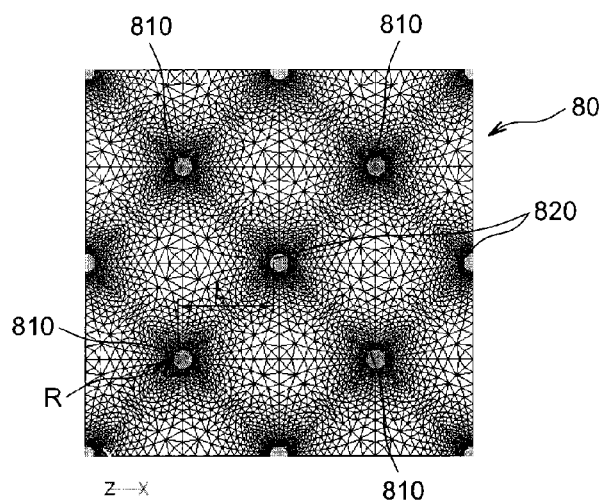
FIG. 5 is an internal transparent top view of the interconnector in FIG. 4.

As can be seen in FIG. 5, the holes 810 and holes 820 are staggered, four holes 810 form a square with a hole 820 in the middle of the square.

Figure 6:
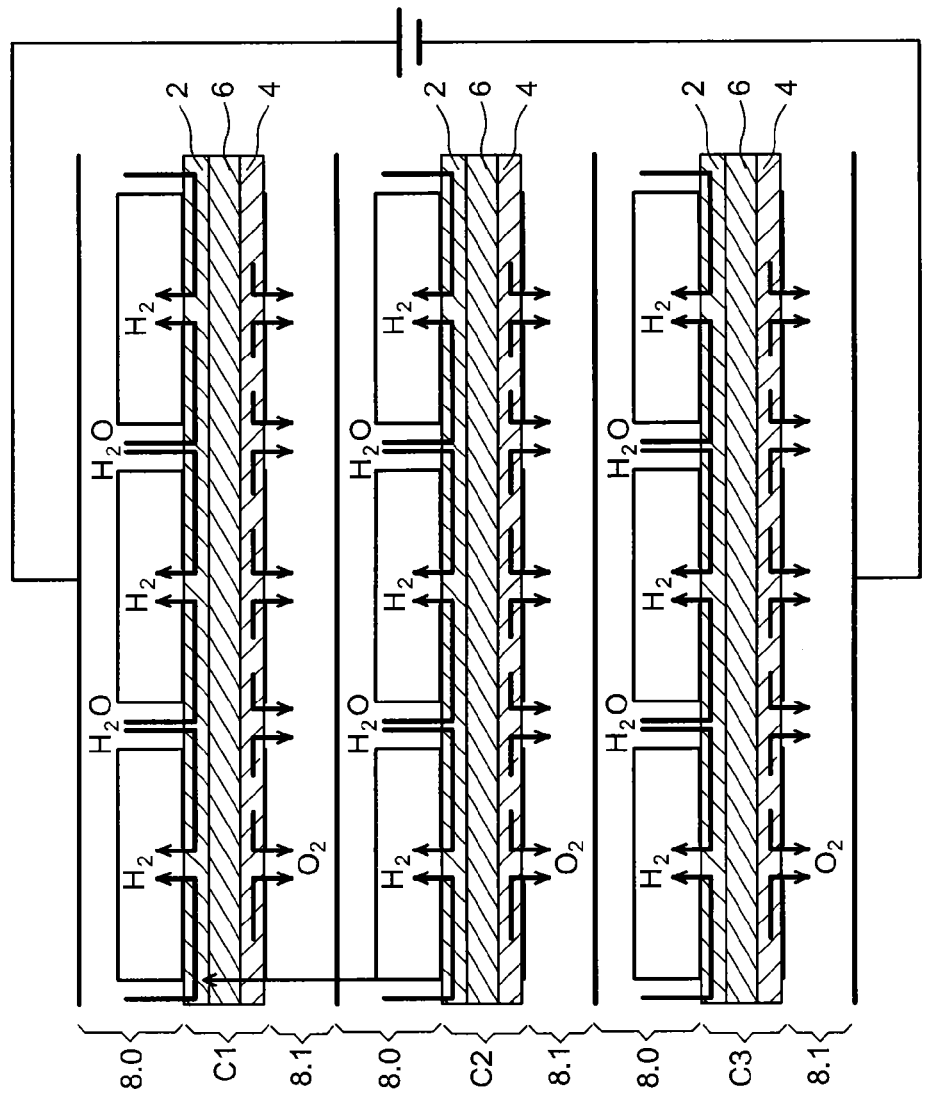
FIG. 6 is a diagrammatic sectional view of an electrolysis device according to the invention with one stack of electrolysis cells.

FIG. 6 diagrammatically shows a stack of three electrolysis cells C1, C2, C3 with interconnectors according to the invention.

More precisely, the current is delivered and collected at the terminals of the stack composed firstly of a first interconnector device 8.0 in contact with the cathode of cell C1 and secondly by a second interconnector device 8.1 in contact with cell C3.

An interconnecting plate composed of a second interconnector 8.1 and a first interconnector 8.0 is arranged between cell C1 and cell C2, the second interconnector 8.1 being in contact with the plane P2 of the anode of cell C1 and the first interconnector 8.0 being in contact with the plane P1 of the cathode of the adjacent cell C2.

This is done in exactly the same manner between the two adjacent cells C2 and C3.

The inventor made the design calculations using the ANSYS FLUENT version 12.0 finite element analysis software to validate the size, number and distribution of holes according to the invention as a function of an imposed operating pressure.

Note that the calculations were made based on a repetition pattern like that shown in FIG. 5, the repetition pattern being an isosceles triangle with side length L defining the pitch of the pattern with a vertex coincident with the centre of a hole 820 through which steam is delivered and another vertex coincident with the centre of a hole 810 through which the hydrogen produced is evacuated.

Note also that for each calculation, all holes 820, 810, 850 for the delivery of steam, evacuation of hydrogen produced and evacuation of output oxygen respectively, have the same radius R.

The results of these calculations are presented below.

Note firstly that operating conditions are as follows:

Voltage of each electrolysis cell=1.17V.

Inlet temperature of fluid injected into the chamber 82=800° C.

Composition of the fluid mix injected at the cathode 2: 10% $H_2$ and 90% $H_2O$ with a flow corresponding to stochiometry of 10% $H_2O$ for a current density i=1 A/cm², namely molar flow of steam:

$$\dot{N}_{H_2O} = \frac{i}{2F} \times \frac{L^2}{2} \times 1.1,$$

In this equation, L is the pitch of the calculation pattern mentioned above and expressed in cm and F is the Faraday constant expressed in Coulombs per mole.

Anode side 4, no draining gas.

All gases are assumed to be incompressible.

Characteristics of the electrolysis cell as defined below in the table:

| ELECTROLYSIS CELL | UNIT | VALUE |
|---|---|---|
| Cathode 2 | | |
| Constituent material | | Ni-YZS |
| Thickness | μm | 315 |
| Thermal conductivity | Wm$^{-1}$K$^{-1}$ | 13.1 |
| Electrical conductivity | Ω$^{-1}$m$^{-1}$ | 10$^5$ |
| Porosity | | 0.37 |
| Permeability | m$^2$ | 10$^{-13}$ |
| Tortuosity | | 4 |
| Current density | Am$^{-2}$ | 5300 |
| Anode 3 | | |
| Constituent material | | LSM |
| Thickness | μm | 20 |
| Thermal conductivity | Wm$^{-1}$K$^{-1}$ | 9.6 |
| Electrical conductivity | Ω$^{-1}$m$^{-1}$ | 1 10$^4$ |
| Porosity | | 0.37 |
| Permeability | m$^2$ | 10$^{-13}$ |
| Tortuosity | | 3.0 |
| Current density | Am$^{-2}$ | 4 |
| | | 2000 |
| Electrolyte 4 | | |
| Constituent material | | YSZ |
| Thickness | μm | 15 |
| Resistivity | Ωm | 0.42 |

EXAMPLE 1

The metallic part 84 forming the second interconnector 8.1 is in direct mechanical contact with the anode 4, as shown in FIG. 3.

The plane P2 of this second interconnector 8.1 is in direct mechanical contact with the plane of the anode as shown in FIG. 3.

The holes 850 for collection of produced oxygen are in line and staggered in exactly the same way as the set of steam delivery and oxygen collection holes 810, 820 respectively.

The same pressure of 1 bar is imposed at the outlet from the hydrogen collection chamber 81 and at the outlet from the oxygen collection chamber 85.

Calculations for this example 1 give:

| L (mm) | R (mm) | $\chi_{H_2}$ (molar fraction of H2) at outlet | Pressure loss ΔP cathode 2 (Pa) | Current density (A/cm$^2$) | Mean potential Nernst (V) | Pressure loss ΔP anode 4 (Pa) |
|---|---|---|---|---|---|---|
| 5.00 | 0.50 | 0.881 | 175869.3 | −0.954 | 0.98208 | 113316.0 |
| 5.00 | 1.00 | 0.928 | 131359.4 | −1.007 | 0.96803 | 69535.7 |
| 5.00 | 1.25 | 0.932 | 116601.6 | −1.013 | 0.96682 | 53384.1 |
| 10.00 | 1.00 | 0.858 | 594598.7 | −0.922 | 0.98767 | 429400.3 |
| 10.00 | 2.00 | 0.931 | 437097.0 | −1.004 | 0.96327 | 275135.9 |
| 10.00 | 2.50 | 0.932 | 379284.7 | −1.005 | 0.96167 | 212467.5 |
| 15.00 | 1.50 | 0.834 | 1291219.8 | −0.883 | 0.99422 | 923301.2 |
| 15.00 | 3.00 | 0.936 | 905496.9 | −1.032 | 0.96663 | 645012.9 |
| 15.00 | 3.75 | 0.936 | 782810.8 | −1.030 | 0.96424 | 504715.2 |
| 20.00 | 2.00 | 0.836 | 2297333.8 | −0.873 | 0.99193 | 1642261.5 |
| 20.00 | 4.00 | 0.900 | 1642480.8 | −0.949 | 0.97164 | 1032564.8 |
| 20.00 | 5.00 | 0.918 | 1358301.9 | −1.011 | 0.96665 | 886366.4 |

This example 1 shows that:
the current density is not very sensitive to the value of the pitch L,
the current density is more sensitive to the radius R of the holes. The current distribution is better when the radius R of the holes is smaller. On the other hand if R is larger, oxygen is better evacuated and the pressure reduces at the anode 4 (pressure losses ΔP at anode 4 increase), which contributes to the Nernst potential being lower. Thus, the current density increases relative to R.

Pressure losses ΔP at the cathode 2 are relatively high. They increase when the pitch L increases or when the hole radius R reduces.

EXAMPLE 2

Example 2 is exactly the same as example 1 except for the imposed pressure that is 30 bars and is the same at the outlet from the hydrogen collection chamber 81 and at the outlet from the oxygen collection chamber 85. The calculations for this example 2 give:

| L (mm) | R (mm) | $\chi_{H_2}$ (molar fraction of H2) at outlet | Pressure loss ΔP cathode 2 (Pa) | Current density (A/cm$^2$) | Mean potential Nernst (V) | Pressure loss ΔP anode 4 (Pa) |
|---|---|---|---|---|---|---|
| 5.00 | 0.50 | 0.894 | 6558.4 | −1.017 | 0.97778 | 4486.2 |
| 5.00 | 1.00 | 0.893 | 4607.2 | −1.015 | 0.97775 | 2454.4 |
| 5.00 | 1.25 | 0.886 | 4005.5 | −1.013 | 0.97771 | 1850.4 |
| 10.00 | 1.00 | 0.924 | 22068.0 | −1.021 | 0.97439 | 17985.3 |
| 10.00 | 2.00 | 0.919 | 15468.2 | −1.014 | 0.97617 | 9799.8 |
| 10.00 | 2.50 | 0.901 | 13337.4 | −1.003 | 0.97666 | 7497.8 |
| 15.00 | 1.50 | 0.925 | 47517.4 | −1.015 | 0.97382 | 40463.3 |
| 15.00 | 3.00 | 0.909 | 33131.8 | −0.999 | 0.97466 | 21974.6 |
| 15.00 | 3.75 | 0.879 | 28531.2 | −0.975 | 0.97442 | 16939.2 |
| 20.00 | 2.00 | 0.924 | 82963.2 | −1.008 | 0.97346 | 71064.3 |
| 20.00 | 4.00 | 0.891 | 57928.9 | −0.9810 | 0.97348 | 38852.1 |
| 20.00 | 5.00 | 0.850 | 49888.0 | −0.953 | 0.97325 | 29952.3 |

In this example 2, it can be seen that the changes observed for example 1 are the same at a pressure of 30 bars, except for pressure losses at the cathode that are lower.

EXAMPLE 3

Example 3 is exactly the same as example 1 except that the plane of the anode is in direct mechanical contact with a gate made of an electrically conducting material instead of the perforated plate of part 84 as shown in FIG. 3. Therefore in this case, this conducting gate is inserted between part 84 and the plane of the anode. The gate is chosen such that it carries current uniformly over the entire area of the cathode. It is also made to be permeable so that pressure losses due to its presence are negligible.

Calculations for this example 3 give:

| L (mm) | R (mm) | $\chi_{H_2}$ (molar fraction of H2) at outlet | Pressure loss ΔP cathode 2 (Pa) | Current density (A/cm$^2$) | Mean potential Nernst (V) | Pressure loss ΔP anode 4 (Pa) |
|---|---|---|---|---|---|---|
| 5.00 | 0.50 | 0.945 | 188865.2 | −1.033 | 0.95317 | 8.4 |
| 5.00 | 1.00 | 0.941 | 133276.2 | −1.028 | 0.96067 | 8.2 |
| 5.00 | 1.25 | 0.937 | 116679.5 | −1.026 | 0.96387 | 8.1 |
| 10.00 | 1.00 | 0.959 | 630151.5 | −1.046 | 0.94812 | 8.4 |
| 10.00 | 2.00 | 0.965 | 439375.0 | −1.048 | 0.95283 | 8.3 |
| 10.00 | 2.50 | 0.963 | 379908.8 | −1.047 | 0.95519 | 8.2 |
| 15.00 | 1.50 | 0.944 | 1382697.6 | −1.020 | 0.94969 | 8.4 |
| 15.00 | 3.00 | 0.956 | 957116.9 | −1.027 | 0.95376 | 8.2 |
| 15.00 | 3.75 | 0.958 | 821479.4 | −1.027 | 0.95577 | 8.1 |
| 20.00 | 2.00 | 0.937 | 2373524.8 | −1.032 | 0.95129 | 8.5 |
| 20.00 | 4.00 | 0.953 | 1688167.2 | −1.012 | 0.95557 | 8.1 |
| 20.00 | 5.00 | 0.954 | 1447916.4 | −1.011 | 0.95731 | 8.0 |

In this example 3, it can be seen that:
the current density is slightly higher than it is for example 1 when a gate is put into direct mechanical contact with the anode. This is explained by the fact that the oxygen pressure obtained with a gate element is lower, and therefore the Nernst potential is lower.

as in examples 1 and 2, the current density is not very sensitive to the value of the pitch L.

the current density increases when the hole radius R reduces, because the current distribution at the cathode is better.

pressure losses ΔP anode at the anode are low.

pressure losses ΔP at the cathode are relatively high. They increase when the pitch L increases or when the hole radius R reduces.

EXAMPLE 4

Example 4 is exactly the same as example 3, except for the imposed pressure that is 30 bars and is the same at the outlet from the hydrogen collection chamber 81 and at the outlet from the oxygen collection chamber 85.

The calculations for this example 4 give:

| L (mm) | R (mm) | $\chi_{H_2}$ (molar fraction of H2) at outlet | Pressure loss ΔP cathode 2 (Pa) | Current density (A/cm$^2$) | Mean potential Nernst (V) | Pressure loss ΔP anode 4 (Pa) |
|---|---|---|---|---|---|---|
| 5.00 | 0.50 | 0.849 | 6109.9 | −1.032 | 0.97754 | 0.3 |
| 5.00 | 1.00 | 0.850 | 4293.8 | −1.032 | 0.97753 | 0.3 |
| 5.00 | 1.25 | 0.845 | 3738.3 | −1.032 | 0.97754 | 0.3 |
| 10.00 | 1.00 | 0.901 | 21222.7 | −1.030 | 0.97411 | 0.3 |
| 10.00 | 2.00 | 0.898 | 14935.6 | −1.028 | 0.97641 | 0.3 |
| 10.00 | 2.50 | 0.888 | 12926.8 | −1.027 | 0.97737 | 0.3 |
| 15.00 | 1.50 | 0.906 | 45716.5 | −1.031 | 0.97257 | 0.3 |
| 15.00 | 3.00 | 0.897 | 32110.8 | −1.030 | 0.97492 | 0.3 |
| 15.00 | 3.75 | 0.885 | 27708.2 | −1.029 | 0.97606 | 0.3 |
| 20.00 | 2.00 | 0.897 | 78422.6 | −1.046 | 0.96975 | 0.3 |
| 20.00 | 4.00 | 0.866 | 55320.5 | −1.045 | 0.97213 | 0.3 |
| 20.00 | 5.00 | 0.842 | 47806.5 | −1.045 | 0.97331 | 0.3 |

In this example 4, it can be seen that the changes observed for example 3 are the same at a pressure of 30 bars, except for pressure losses at the cathode that are lower.

The conclusions that can be drawn from examples 1 to 4 above are that the electrolysis performance itself appears to be fairly insensitive to the layout of the basic pattern (value of the pitch L) since the molar fraction of hydrogen at the outlet $\chi_{H_2}$ remains approximately constant.

On the other hand, hydraulic performances seem to be sensitive to the imposed pressure since pressure losses are higher at a lower pressure (1 bar in the examples). Therefore the inventor concluded that it seems preferable to have an electrolysis device according to the invention operate at high pressure.

Other improvements can be made without going outside the scope of the invention.

Although it has not been described in detail, it is obvious that an embodiment in which steam is supplied through the chamber 81 and hydrogen produced is recovered through the chamber 2 will work.

CITED REFERENCE

[1]: Xiango Li, *International Journal of hydrogen Energy* 30 (2005) 359-371.

The invention claimed is:

1. A device for electrolysis of water, comprising:
    at least one elementary electrolysis cell including a cathode, an anode, and an electrolyte intermediate between the cathode and the anode; and
    a first device configured to form an electric and fluidic interconnection, and comprising a metallic part delimited by at least a first plane, the metallic part comprising two superimposed internal chambers and a plurality of holes distributed around a surface that is approximately perpendicular to the first plane, the plurality of holes being divided into two groups, a first group of holes opening onto the first plane and directly into a first chamber of the two superimposed internal chambers that is adjacent to the first plane, a second group of holes opening onto the first plane and, via channels which pass through the first chamber, into a second chamber of the two superimposed internal chambers that is separate from the first plane, the first plane of the first device being in mechanical contact with a plane of the cathode,
    wherein the device for electrolysis of water is configured to function at a temperature of at least 450 degrees Celsius.

2. A device for electrolysis of water according to claim 1, wherein the chamber adjacent to the first plane is configured to deliver steam and the chamber separate from the first plane is configured to collect hydrogen produced by electrolysis.

3. A device for electrolysis of water according to claim 1, wherein the chamber adjacent to the first plane is configured to collect hydrogen produced by electrolysis and the chamber separate from the first plane is configured to deliver steam.

4. A device for electrolysis of water according to claim 1, wherein the plurality of holes have a circular cross-section with a diameter of between 0.5 and 5 mm.

5. A device for electrolysis of water according to claim 1, wherein a distance between a center of two adjacent holes of the plurality of holes is between 7 mm and 28 mm.

6. A device for electrolysis of water according to claim 1, wherein the plurality of holes are aligned along parallel lines at equal intervals.

7. A device for electrolysis of water according to claim 6, wherein lines including holes from the first group of holes alternates with lines including holes from the second group of holes.

8. A device for electrolysis of water according to claim 7, wherein holes from the first group of holes are arranged in a line so as to be staggered with respect to holes from the second group of holes in an adjacent line, each hole from the first group of holes being located at a midpoint among four holes from the second group of holes, and each hole from the second group of holes being located at a midpoint among four holes from the first group of holes.

9. A device for electrolysis of water according to claim 8, wherein the four holes of the first group of holes form a square, a hole from the second group of holes being in a middle of the square, and
    the four holes of the second group of holes form a square, a hole from the first group of holes being in a middle of the square.

10. A device for electrolysis of water according claim 9, comprising:
    a second device configured to form an electrical and fluidic interconnection, and comprising a metal part delimited by at least one second plane, the metallic part comprising an internal chamber and another plurality of holes distributed over an entire surface, approximately perpendicular to the second plane and opening onto the second plane and into the internal chamber, the second plane of the second device being in mechanical contact with a plane of the anode.

11. A device for electrolysis of water according to claim 10, wherein the second plane is in direct mechanical contact with the plane of the anode.

12. A device for electrolysis of water according to claim 10, wherein the second plane is in direct mechanical contact with a gate made of an electrically conducting material, the gate being in direct mechanical contact with the plane of the anode.

13. A device for electrolysis of water according to claim 10, comprising:
- a stack of elementary electrolysis cells each including a cathode, an anode, and an electrolyte placed between the cathode and the anode;
- an interconnecting plate comprising the first and the second devices disposed between two adjacent elementary cells such that the first plane of the first device is in mechanical contact with a cathode of one of the two elementary cells and the second plane of the second device is in mechanical contact with an anode of the other of the two elementary cells.

14. A hydrogen production assembly comprising a plurality of electrolysis devices according to claim 13.

15. The device for electrolysis of water according to claim 1, wherein the channels are tubular spacers extending through said first chamber that is adjacent to the first plane, said tubular spacers being further entirely surrounded by said first chamber, so that said first chamber is encircling the tubular spacers over their entire length.

* * * * *

UNITED STATES PATENT AND TRADEMARK OFFICE
CERTIFICATE OF CORRECTION

| | | |
|---|---|---|
| PATENT NO. | : 9,200,374 B2 | Page 1 of 1 |
| APPLICATION NO. | : 13/583099 | |
| DATED | : December 1, 2015 | |
| INVENTOR(S) | : Christian Perret | |

It is certified that error appears in the above-identified patent and that said Letters Patent is hereby corrected as shown below:

On the title page, Item (54) and in the specification, Column 1, the Title is incorrect. Item (54) and Column 1 should read:

--DEVICE FOR HIGH-TEMPERATURE ELECTROLYSIS OF WATER WITH IMPROVED OPERATION--

Signed and Sealed this
Ninth Day of August, 2016

Michelle K. Lee
*Director of the United States Patent and Trademark Office*